(12) United States Patent
Giansante et al.

(10) Patent No.: US 11,479,429 B2
(45) Date of Patent: Oct. 25, 2022

(54) METHOD AND APPARATUS FOR PREPARING EDGES OF REELS OF WEB MATERIAL

(71) Applicant: Fameccanica.Data S.p.A., San Giovanni Teatino (IT)

(72) Inventors: Antonio Giansante, San Giovanni Teatino (IT); Devin Cucchiella, San Giovanni Teatino (IT)

(73) Assignee: Fameccanica.Data S.p.A.

( * ) Notice: Subject to any disclaimer, the term of this patent is extended or adjusted under 35 U.S.C. 154(b) by 0 days.

(21) Appl. No.: 17/118,681

(22) Filed: Dec. 11, 2020

(65) Prior Publication Data

US 2021/0188584 A1 Jun. 24, 2021

(30) Foreign Application Priority Data

Dec. 18, 2019 (IT) .................. 102019000024556

(51) Int. Cl.
*B29C 65/00* (2006.01)
*B65H 19/18* (2006.01)
*B25J 15/00* (2006.01)
*B65H 3/08* (2006.01)
*B29C 65/60* (2006.01)
(Continued)

(52) U.S. Cl.
CPC ............ *B65H 19/18* (2013.01); *B25J 15/008* (2013.01); *B65H 3/0808* (2013.01); *B29C 65/5092* (2013.01); *B29C 65/60* (2013.01); *B29C 65/7894* (2013.01); *B29C 66/472* (2013.01); *B65H 2301/4171* (2013.01)

(58) Field of Classification Search
CPC ...... B65H 19/18; B29C 65/50; B29C 65/5092; B29C 65/7894; B29C 66/472
See application file for complete search history.

(56) References Cited

U.S. PATENT DOCUMENTS

| | | | |
|---|---|---|---|
| 5,197,688 A | 3/1993 | Giorgio et al. | |
| 5,219,127 A * | 6/1993 | Boldrini | B65H 19/123 242/559.1 |

(Continued)

FOREIGN PATENT DOCUMENTS

| | | |
|---|---|---|
| DE | 4040545 A1 | 6/1991 |
| DE | 4236691 A1 | 5/1994 |

(Continued)

OTHER PUBLICATIONS

Italian Search Report dated Jul. 27, 2020. 8 pages.

*Primary Examiner* — Philip C Tucker
*Assistant Examiner* — Nickolas R Harm
(74) *Attorney, Agent, or Firm* — RMCK Law Group PLC

(57) ABSTRACT

A method and apparatus for preparing edges of reels of web material, where a reel is held with its axis horizontal; a manipulator applies a first adhesive element on an outer surface of the reel; a gripping member picks up the first adhesive element and forms a loop; and a cutting device transversely cuts the web material at the loop. A section of web material with a length equal to or greater than a circumference of the reel is unwound from the reel; a second adhesive element is applied on an outer surface or on an inner surface of the web material; and a scrap portion of the web material is cut and discarded by a suction device.

7 Claims, 15 Drawing Sheets

(51) Int. Cl.
*B29C 65/50* (2006.01)
*B29C 65/78* (2006.01)

(56) References Cited

U.S. PATENT DOCUMENTS

| | | | |
|---|---|---|---|
| 6,805,765 B1 * | 10/2004 | Brandli | B65H 19/102 |
| | | | 242/555.3 |
| 2003/0015296 A1 | 1/2003 | Pelagatti et al. | |
| 2003/0116256 A1 * | 6/2003 | Erickson | B65H 19/105 |
| | | | 156/504 |

FOREIGN PATENT DOCUMENTS

| | | |
|---|---|---|
| EP | 0943568 A1 | 9/1999 |
| GB | 2091224 A | 7/1982 |
| GB | 2101919 A | 1/1983 |

* cited by examiner

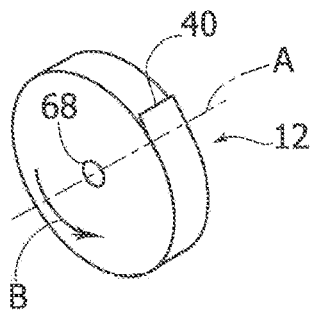
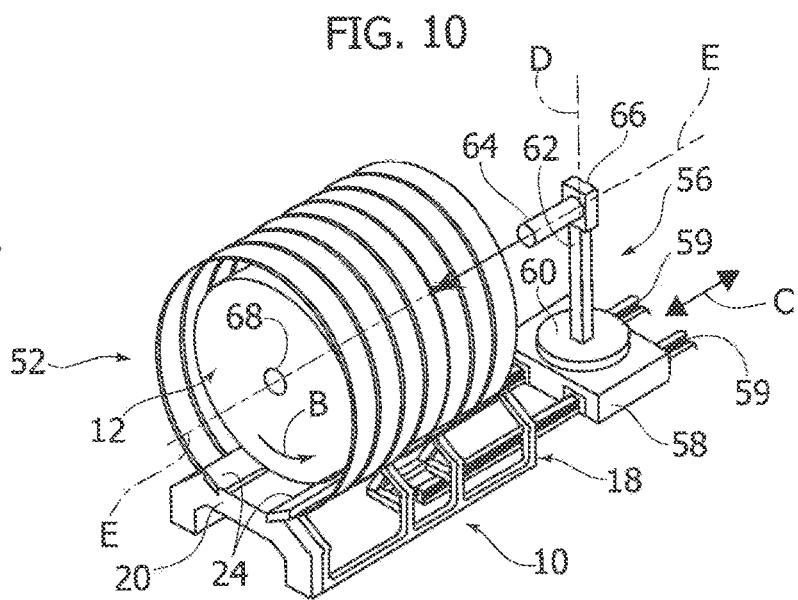
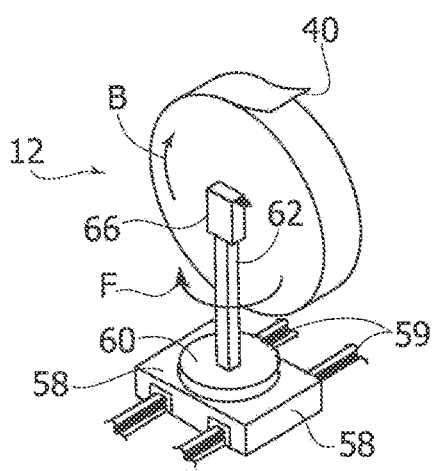
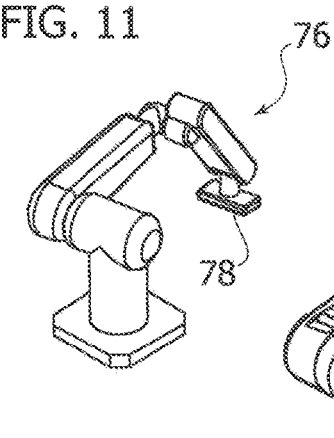
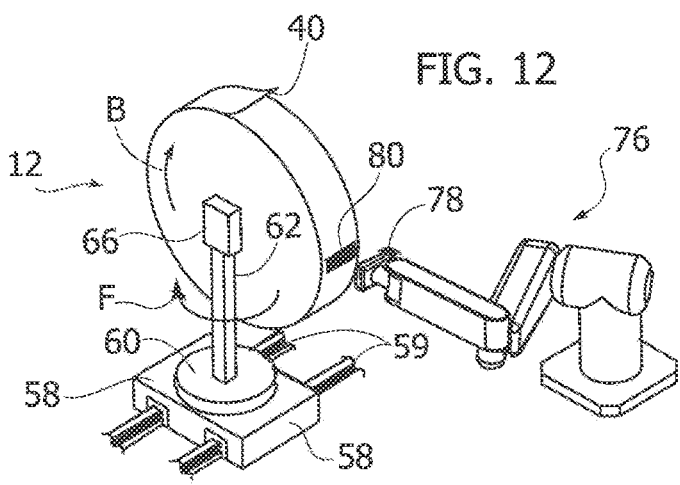

FIG. 19
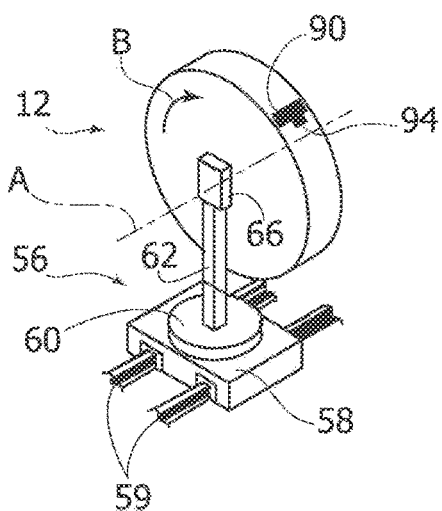
FIG. 20
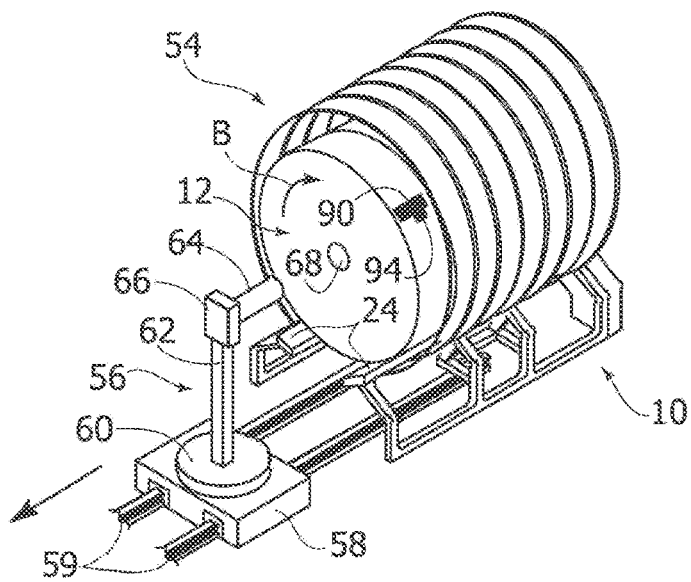
FIG. 21
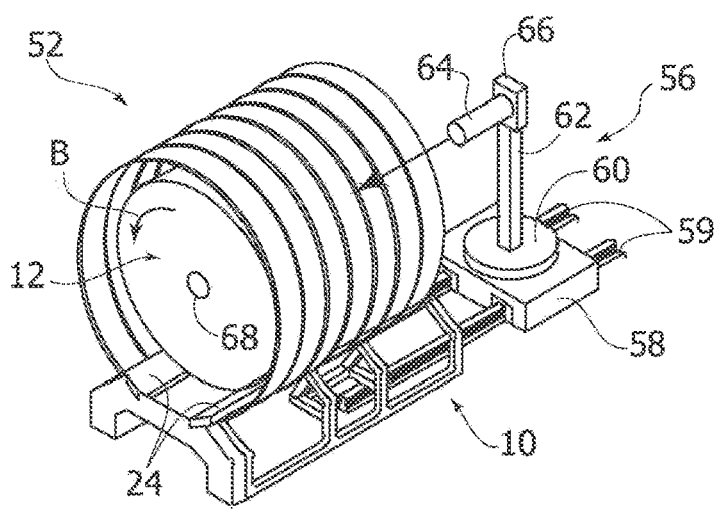
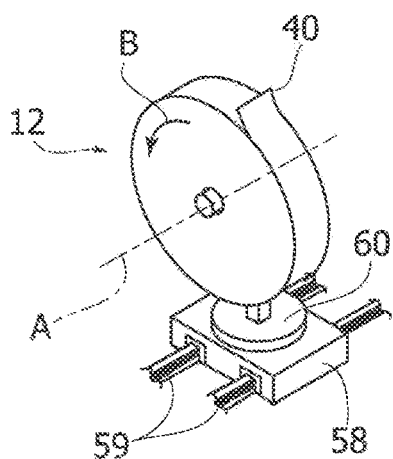
FIG. 22
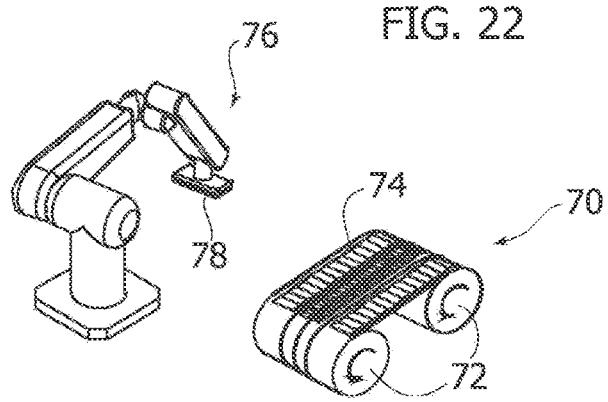

METHOD AND APPARATUS FOR PREPARING EDGES OF REELS OF WEB MATERIAL

CROSS-REFERENCE TO RELATED APPLICATION

This application claims priority to Italian Patent Application No. 102019000024556 filed Dec. 18, 2019. The disclosure of the above application is incorporated herein by reference in its entirety.

FIELD OF THE INVENTION

The present invention relates to a method and apparatus for preparing edges of reels of web material.

The invention has been developed, in particular, for applying to the field of producing absorbent sanitary articles. In the following description, reference will be made to this specific field without however losing generality.

DESCRIPTION OF THE PRIOR ART

In machines for producing absorbent sanitary articles, large quantities of web materials are used, for example, non-woven fabric. The web material used in machines for producing absorbent sanitary articles is contained in reels having a width equal to the width of the web material, and a diameter in the order of 1-1.5 meters.

Modern machines for producing absorbent sanitary articles operate at increasingly higher speeds, so that the speed of unwinding of the web materials from the reels tends to becomes faster and faster, increasing the frequency with which the finished reels are replaced with new reels.

Replacing a finished reel with a new reel must be carried out by maintaining continuity between the web material coming from the reel close to finishing and the web material coming from the new reel, in order not to interrupt the operation of the machine. The continuity of the web material is obtained by making a joint, usually made by means of adhesive, between the tail portion of the web that is unwinding from a reel in the process of finishing with the leading portion of a web wound on a new reel.

In order to quickly and automatically create the joint on the unwinding assemblies of the reels, it is necessary to preliminarily carry out an adequate preparation of the leading edges of the new reels.

Solutions are known that envisage carrying out the preparation of the edges and the joint between the webs of two reels directly on the unwinding assembly of the machine for producing absorbent sanitary articles. One example of this prior art is described in EP-A-1277683 by the same Applicant.

Preparation of the edges of the reels carried out directly on the unwinding assembly could cause the machine to stop in case of malfunctions or jams of the automatic device for preparing the edges.

For this reason, it may be preferable to carry out the preparation of the edges of the reels off-line in order to load the reels—with the edges ready for carrying out the joint—onto the unwinding assemblies of the machine for producing absorbent sanitary articles.

There is, therefore, a need to provide apparatuses to automatically carry out the preparation of the edges of the reels off-line, capable of operating quickly, efficiently and minimizing the risk of jams.

OBJECT AND SUMMARY OF THE INVENTION

The present invention aims to provide a method and an apparatus for preparing edges of reels of web material that satisfies the aforesaid requirements According to the present invention, this object is achieved, by a method and by an apparatus having the characteristics forming the subject of claims 1 and 8.

The claims form an integral part of the disclosure provided here in relation to the invention.

BRIEF DESCRIPTION OF THE DRAWINGS

The present invention will now be described in detail with reference to the attached drawings, given purely by way of non-limiting example, wherein:

FIGS. 9-20 are schematic perspective views illustrating the sequence of operations for applying adhesive elements on the outer surface of the edge of web material, FIGS. 21-31 are schematic perspective views illustrating the sequence of operations for applying adhesive elements on the inner surface of the edge of web material, and FIGS. 32*a*, 32*b*-35*a*, 35*b* are schematic views illustrating possible arrangements of the reels on unwinding assemblies.

DETAILED DESCRIPTION

With reference to FIGS. 1-6, numeral 10 indicates a reel-holder unit configured to support a plurality of reels of web material 12. The reel-holder unit 10 is used to transport the reels of web material 12 in a production plant, for example, in a plant for producing absorbent sanitary articles.

Figure 1:
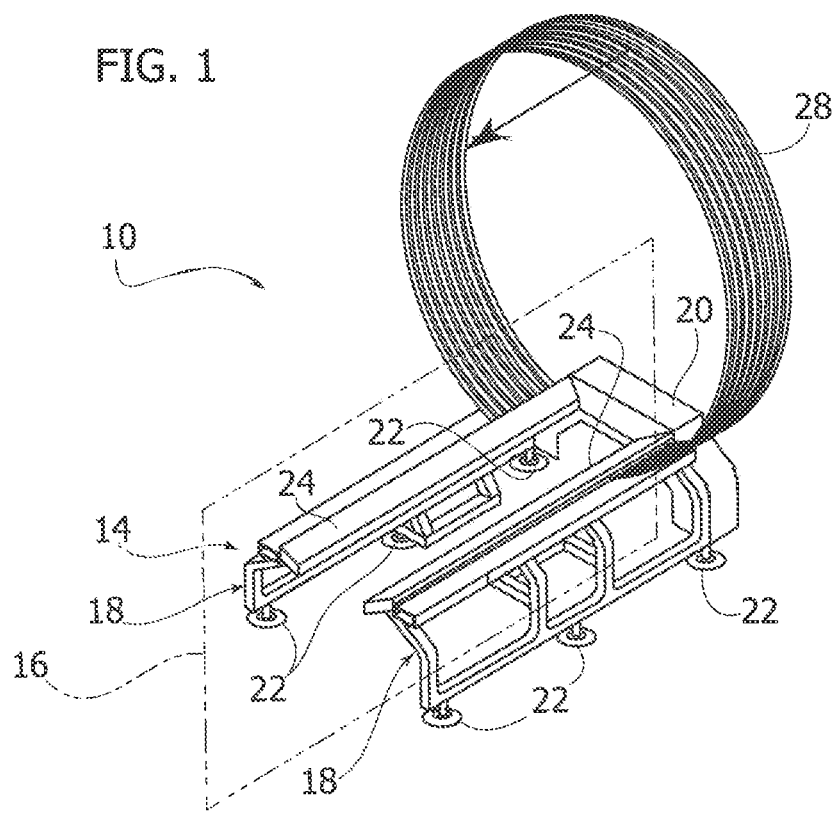
FIG. 1 is a perspective view of a reel-holder unit for transporting reels of web material.

With reference in particular to FIG. 1, the reel-holder unit 10 comprises a frame 14 having a vertical longitudinal plane 16. The frame 14 comprises two frame sections 18 arranged on opposite sides of the vertical longitudinal plane 16. The two frame sections 18 are separated and spaced apart in a direction perpendicular to the vertical longitudinal plane 16.

The frame 14 comprises a header 20 which joins together the two frame sections 18. The header 20 is located at a first front end of the frame 14. The second front end of the frame 14, opposite the header 20, is open. The two frame sections 18 extend horizontally from the header 20 according to a general U-shaped configuration, so as to leave a free passage space between the two frame sections 18. The two frame sections 18 may be provided with respective feet 22 for resting on the ground.

The two frame sections 18 comprise respective reel support bars 24 which extend horizontally along respective axes parallel to the vertical longitudinal plane 16. The reel support bars 24 may have respective flat surfaces inclined with respect to a vertical plane and arranged according to a general V configuration upwardly open.

Figure 2:
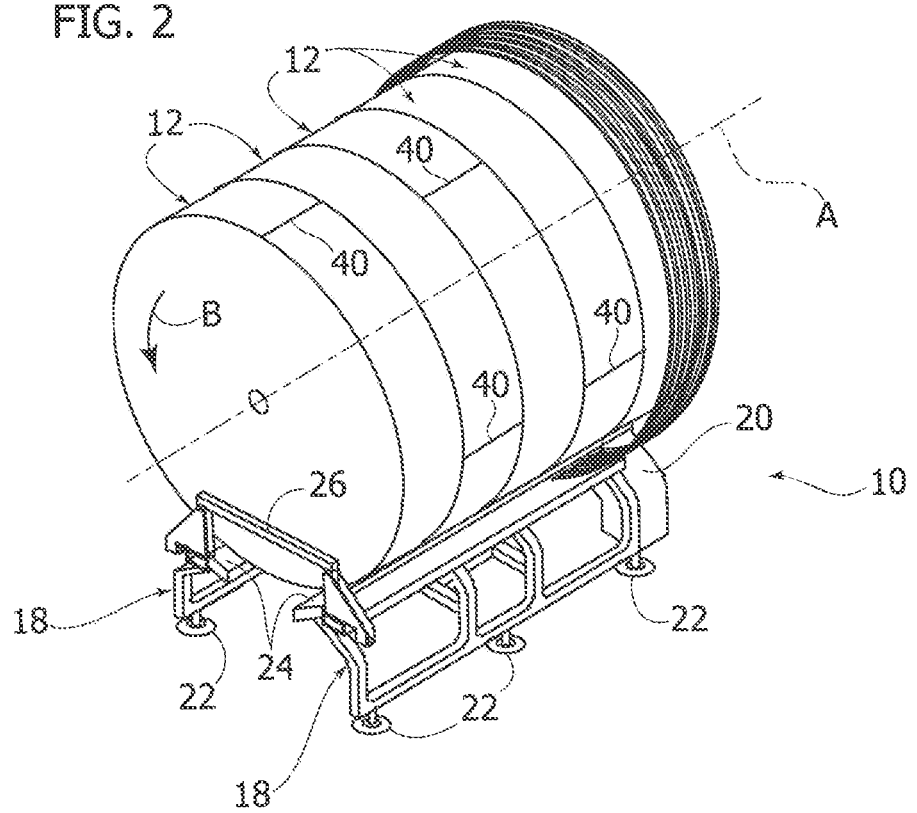
FIG. 2 is a perspective view illustrating the reel-holder unit of FIG. 1 loaded with a plurality of reels of web material.

With reference to FIG. 2, the reels of web material 12 are arranged in an upright position on the reel-holder unit 10. The outer circumferential surfaces of the reels 12 rest on the two reel support bars 24. The two reel support bars 24 are spaced apart by a distance determined as a function of the diameter of the reels 12, so as to stably support the reels 12 in an upright position.

The reels 12 are arranged on the reel-holder unit 10 with their respective axes A aligned with each other. The adjacent reels 12 are in contact with each other along respective vertical front surfaces.

After having loaded an array of reels 12 on the reel-holder unit 10, a removable tailboard 26 may be applied to the open end of the frame 12. The reels 12 located at the opposite ends of the array of reels rest frontally against the header 20 or against the removable tailboard 26. In this way, the array of reels 12 is constrained to the frame 14 in the direction of the longitudinal axis A, and prevents the reels 12 from falling during transport.

Figure 3:
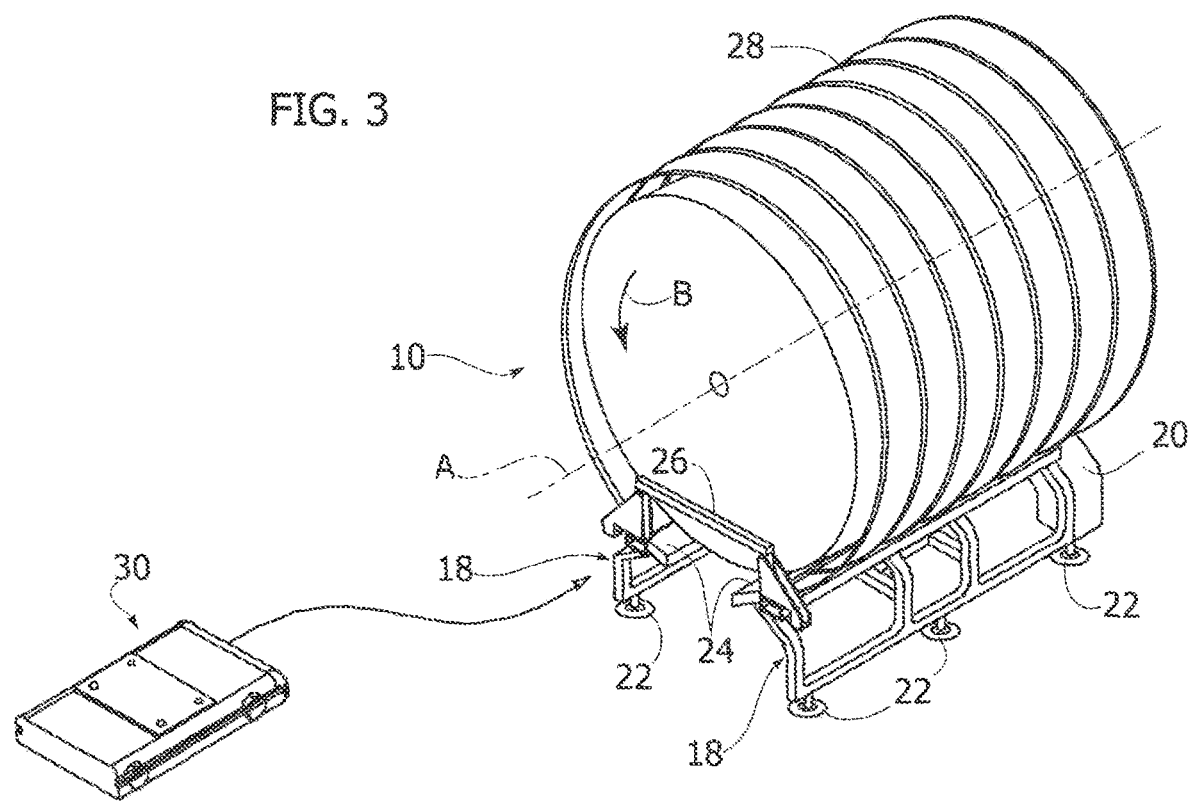
FIG. 3 is a schematic perspective view that illustrates the reel-holder unit of FIGS. 1 and 2 associated with an automatic guided vehicle.
Figure 6:
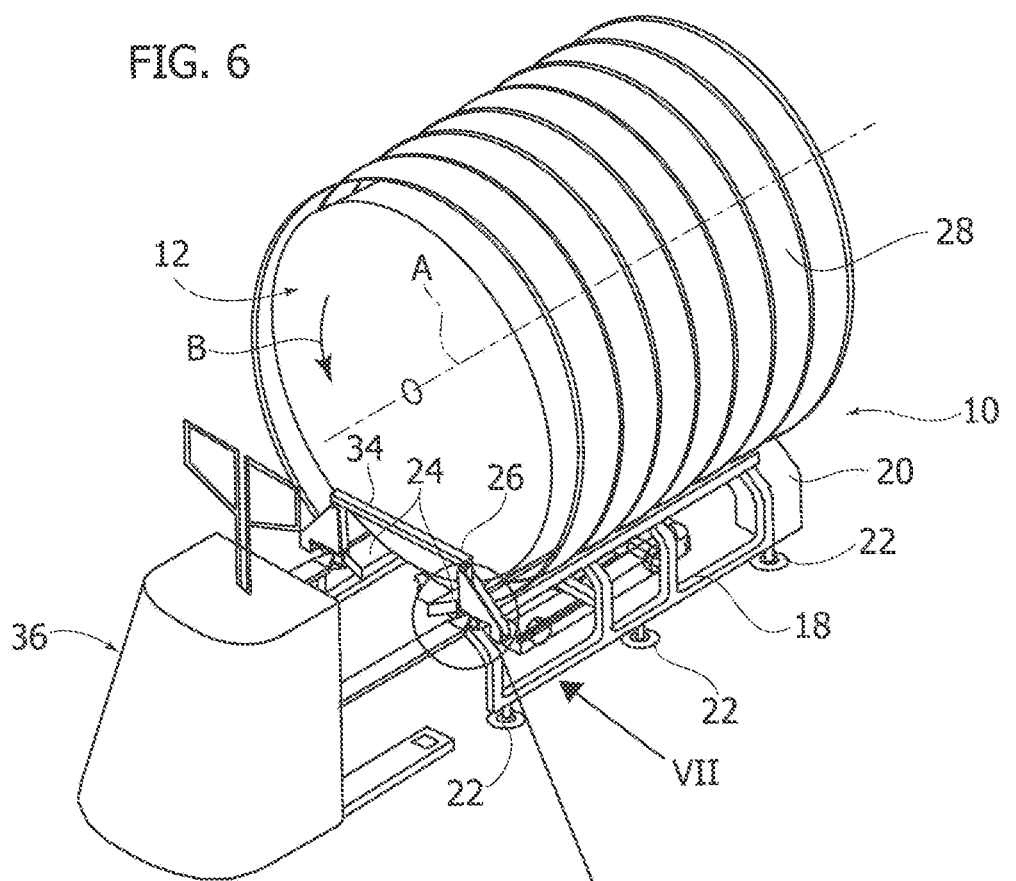
FIG. 6 is a perspective view that illustrates the transport of the reel-holder unit by means of a fork conveyor.

With reference to FIGS. 1-3, the reel-holder unit 10 may comprise a protective cover 28. The protective cover 28 may be extended and retracted telescopically in the direction of the axis A. FIGS. 1 and 2 illustrate the protective cover in the retracted position, and FIGS. 3 and 6 show the protective cover 28 in the extended position. The protective cover 28 may, for example, be formed by a plurality of circular sectors which can be interpenetrable and extendable relative to each other. In the extended position, the protective cover 28 may have a tubular shape which extends around the array of reels 12 positioned on the frame 14.

Figure 4:
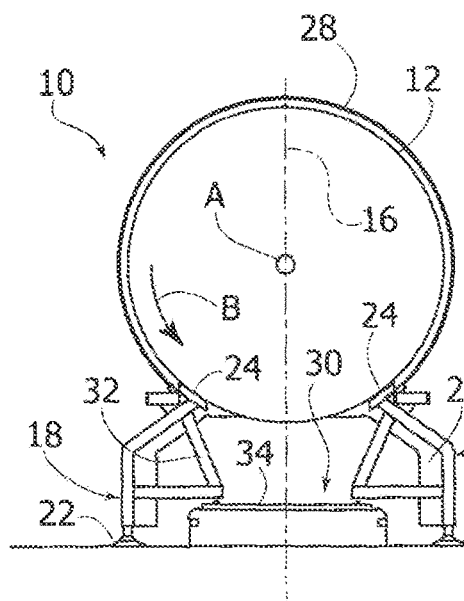
FIGS. 4 and 5 are front elevation views illustrating the operation of the automatic guided vehicle used for transporting the reel-holder unit.
Figure 5:
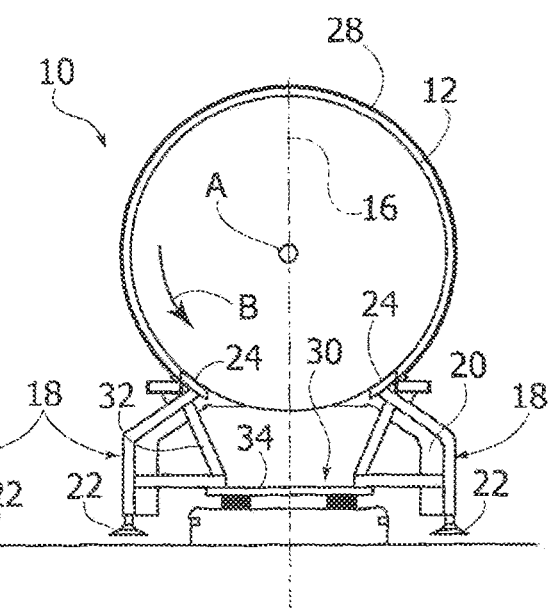

With reference to FIG. 3, the reel-holder unit 10 may be moved by means of an automatic guided vehicle (AGV) 30. With reference to FIGS. 4 and 5, the automatic guided vehicle 30 may be inserted into the center of the frame 14 between the two frame sections 18. The two frame sections 18 may have respective brackets 32 protruding inwards. The automatic guided vehicle 30 may have a vertically-movable support 34, which can be moved between a lowered position (FIG. 4) and a raised position (FIG. 5). As can be seen in FIG. 5, the vertically-movable support 34 of the automatic guided vehicle 30 may rest on the brackets 32 of the frame sections 18 to lift the reel-holder 10 and the reels 12 supported thereby from the ground. In the configuration wherein the reel-holder unit 10 is raised from the ground, the automatic guided vehicle 30 may transport the reel-holder unit 10 and the relative reels 12 along a programmable path.

Figure 7:
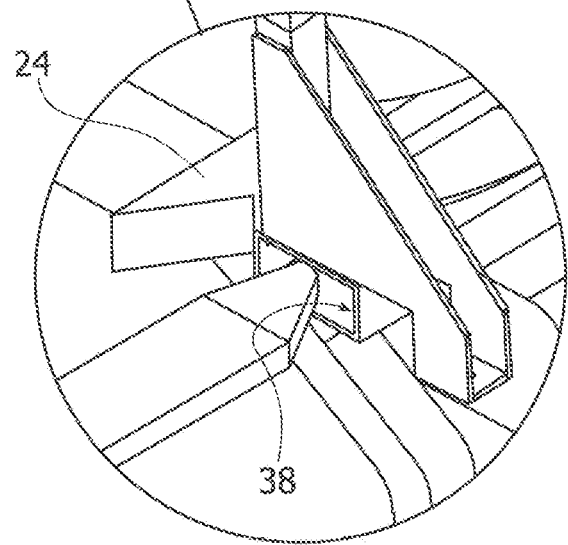
FIG. 7 is a detail on a larger scale of the part indicated by the arrow VII in FIG. 6.

With reference to FIGS. 6 and 7, in a possible embodiment, the reel-holder unit 10 can be moved by means of a fork lifter 36, such as, for example, a transpallet or a forklift truck. The two frame sections of the reel-holder unit 10 may be provided with longitudinal seats 38 (FIG. 7) shaped to receive the forks of the fork lifter 36.

The reels 12 are positioned on the reel-holder 10 using a hoist or similar lifting systems. The reels 12 may be loaded onto the reel-holder unit 10 so that the respective unwinding directions, indicated by the arrow B, are concordant with each other. The reels 12 have respective leading edges 40, which are usually glued to the outer surfaces of the respective reels 12, to prevent the end portion of the web material from unwinding from the reel during transport. The leading edges 40 of the various reels 12 loaded onto the reel-holder unit 10 may be arranged in a random orientation.

Figure 8:
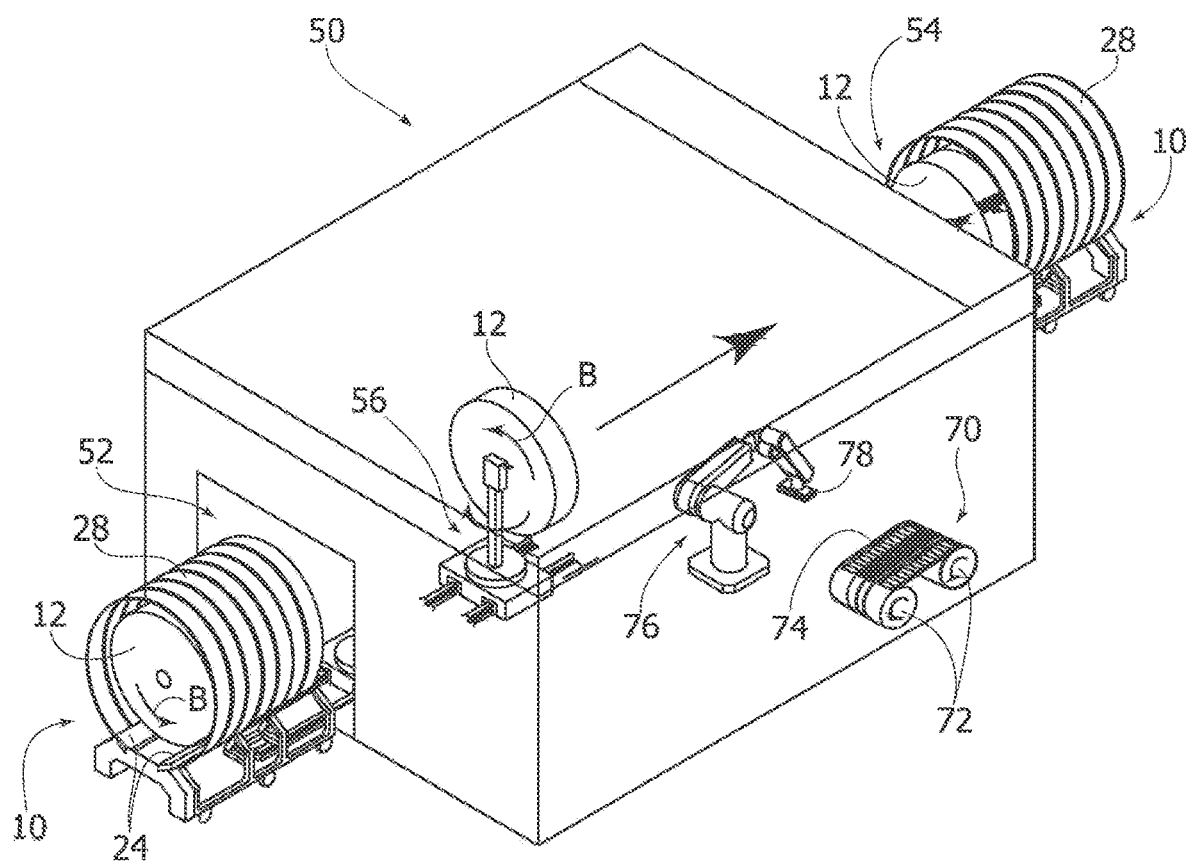
FIG. 8 is a perspective view of an apparatus for preparing edges of reels of web material.

With reference to FIG. 8, numeral 50 indicates—in its entirety—an apparatus for preparing the edges of the reels of web material 12. The term "preparing the edges" means all the preliminary operations necessary to carry out the joint between the webs of two reels. In particular, for preparing the edges of the reels, it is necessary to remove the portion of web material forming the outer turn of each reel 12 (which is frequently dirty or damaged), and to apply on the leading edge of the reel—formed after removing the outer turn—the elements necessary for joining a corresponding reel to the tail edge. Generally, a layer of double-sided adhesive tape is applied to the leading edge of each reel, which is used to join to the tail portion of a web of a reel in the process of finishing. Metallic elements may also be applied to the leading edge of each reel, which allow detection of the joint zone, by means of a metal detector. In some cases it is also envisaged to apply adhesive elements along the side edges adjacent to the leading edge to stiffen the leading edge.

One of the aspects to be taken into consideration during the preparation of the edges of the reels 12 is that preparing the edges is normally carried out on the outer side or the inner side of the webs. FIGS. 32a, 32b to 35a, 35b illustrate possible arrangements of the reels 12 on automatic unwinding assemblies. These Figures are useful to understand why preparing the edges must normally be carried out on the outer side or the inner side of the webs. An automatic unwinding assembly of a production machine generally has two winders that carry a reel being unwound and a reserve reel, respectively. In FIGS. 32a, 32b to 35a, 35b, the reels 12 are rotatable on respective unwinding winders around their respective axes A. The arrows B indicate the unwinding direction of the webs, which coincides with the rotation direction of the reels 12 around the respective axes A while unwinding the webs. In FIGS. 32a-35a, the reel 12 mounted on the right winder is the reel being unwound, and the reel mounted on the left winder is the reserve reel. In FIGS. 32b-35b, the reel 12 mounted on the left winder is the reel being unwound, and the reel mounted on the right winder is the reserve reel. The reserve reels 12 have an adhesive element 90 applied to the leading portion of the web, which serves to join the leading portion of the web of the reserve reel with the tail portion of the web of the reel being unwound, when the reel is being unwound and is almost finished. As can be seen in FIGS. 32a, 32b to 35a, 35b, depending on the unwinding direction of the reels 12 (clockwise or anticlockwise), and depending on the path of the web on a deflection roller, the adhesive element 90 must be arranged on the outer side or on the inner side of the web of the reserve reel 12.

Figure 32A:
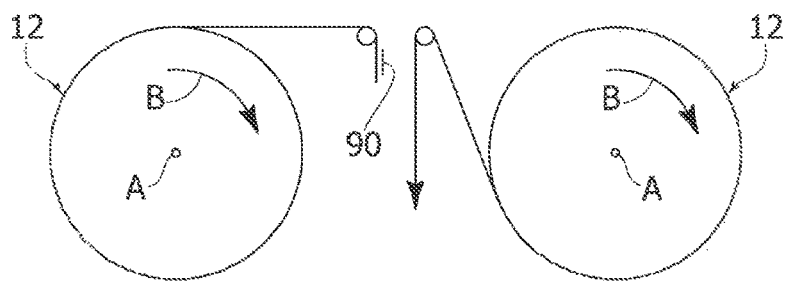
Figure 32B:
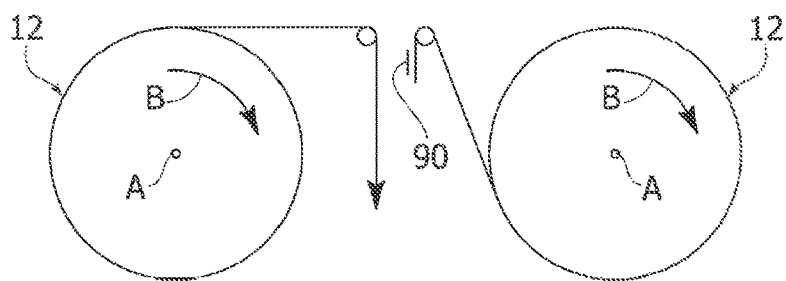

In particular, in the arrangement of FIGS. 32a, 32b, the adhesive element 90 must be on the outer side of the web when the reserve reel 12 is mounted on the left winder (FIG. 32a) and, instead, must be on the inner side of the web when the reserve reel 12 is mounted on the right winder (FIG. 32b).

Figure 33A:
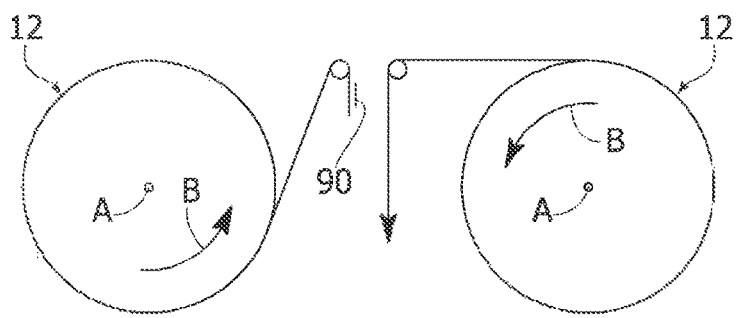
Figure 33B:
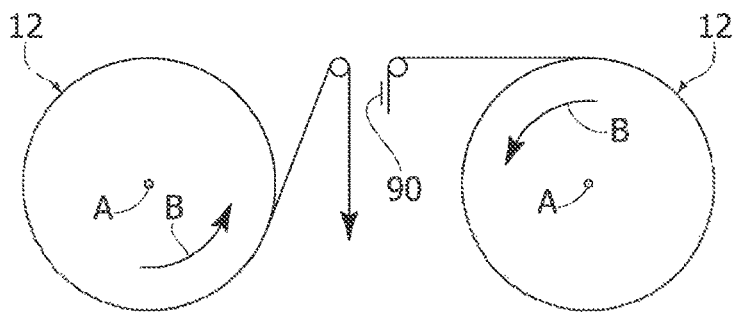

In the arrangement of FIGS. 33a, 33b, the adhesive element 90 must be on the inner side of the web when the reserve reel 12 is mounted on the left winder (FIG. 33a) and, instead, must be on the outer side of the web when the reserve reel 12 is mounted on the right winder (FIG. 33b).

Figure 34A:
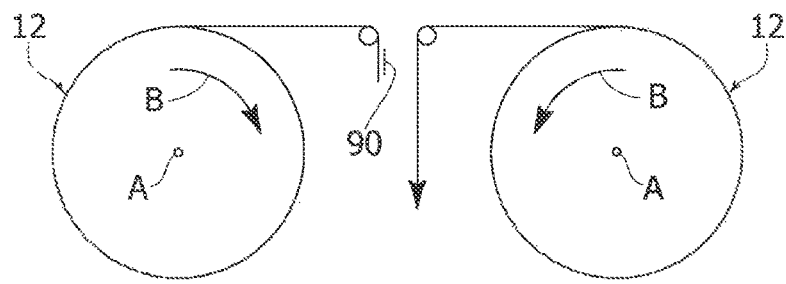
Figure 34B:
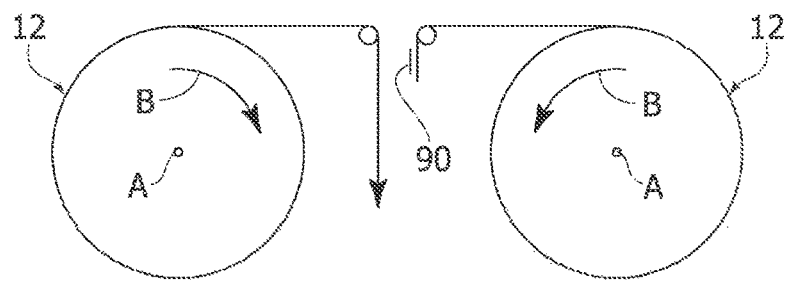

In the arrangement of FIGS. 34a, 34b, the adhesive element 90 must be on the outer side of the web both when the reserve reel 12 is mounted on the left winder (FIG. 34a) and when the reserve reel 12 is mounted on the right winder (FIG. 34b).

Figure 35A:
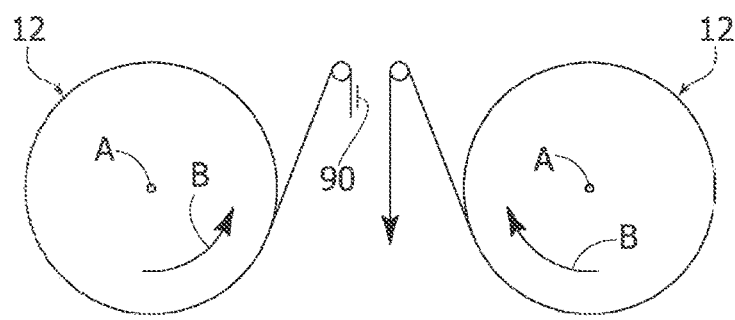
Figure 35B:
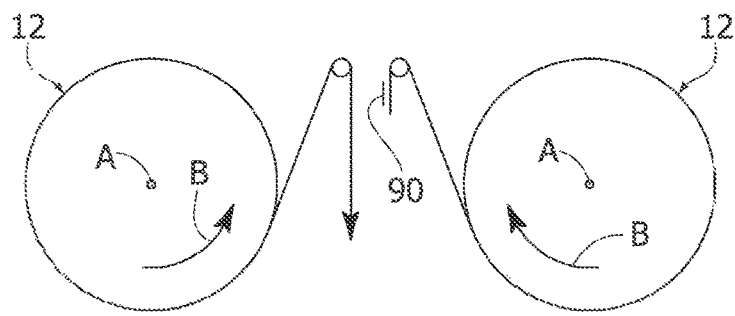

In the arrangement of FIGS. 35a, 35b, the adhesive element 90 must be on the inner side of the web both when the reserve reel 12 is mounted on the left winder (FIG. 35a) and when the reserve reel 12 is mounted on the right winder (FIG. 35b).

The arrangement of FIGS. 34a, 34b and 35a, 35b is advantageous as the adhesive element 90 always remains on the same side of the web regardless of where the reserve reel is mounted.

With reference to FIG. 8, the apparatus 50 comprises an inlet station 52 and an outlet station 54 at which respective reel-holder units 10 can be arranged. The apparatus 50 comprises a reel pick-up device 56, which is configured to pick up a reel 12 from the reel-holder unit 10 located at the inlet station 12, to retain the reel 12 during the edge-preparation operations, and to deposit the reel 12 with the prepared edge on the reel-holder unit 10 located at the outlet station 54.

With reference to FIG. 8, the two reel-holder units 10 are positioned at the inlet station 52 and at the outlet station 54, with their respective open sides facing the operation area of the apparatus 50.

With reference to FIG. 10, the reel pick-up device 56 comprises a base 58 which can be moved along at least one straight direction C, a rotatable support 60 that rotates with respect to the base 58 around a vertical axis D, an upright 62 that extends upwards from the rotatable support 60, and a horizontal shaft 64 extending along a horizontal axis E, perpendicular with respect to the vertical axis D. The shaft 64 may be carried by a translatable support 66, movable in a vertical direction with respect to the upright 62.

With reference to FIG. 10, the translation direction C of the reel pick-up device 56 is aligned with the central longitudinal plane 16 of the reel-holder 10 located at the inlet station 52. For picking-up a reel 12, the reel pick-up device 56 is brought closer to the reel-holder unit 10 located at the inlet station 52. The vertical position of the shaft 64 is adjusted so that the shaft 64 is aligned with respect to the central holes 68 (aligned with each other) of the reels 12 positioned on the reel-holder unit 10. The base 58 of the reel pick-up device 56 can be freely inserted between the two frame sections 18 of the reel-holder unit 10 to pick up the reels 12 spaced apart from the open side of the reel-holder unit 10.

During the movement of the reel pick-up device 56 in the direction C towards the reel-holder unit 10, the shaft 64 fits into the center hole 68 of the reel 12 closest to the open side of the reel-holder 10. When the shaft 64 has engaged the hole 68 of the reel 12 located at the end of the array, the translation movement of the base 58 is stopped. The shaft 64 may also engage several reels 12 simultaneously. For example, the shaft 64 may simultaneously engage two reels 12 having a smaller width than a reel that can be picked up individually.

At this point, the shaft 64 is lifted in the vertical direction and the reel 12 engaged by the shaft 64 is lifted from the reel support bars 24 of the reel-holder unit 10. At this point, the reel pick-up device 56 moves in the direction C, moving away the reel 12 engaged by the shaft 64 from the remaining reels 12 supported by the reel-holder unit 10.

After picking-up a reel 12 by means of the reel pick-up device 56, the automatic sequence for preparing the edge begins. As previously indicated, the edge-preparation operation may involve the outer surface or the inner surface of the web material, depending on how the reel is mounted on the unwinding assembly of the production machine (see FIGS. 32a, 32b-35a, 35b.)

The apparatus 50 is able to automatically carry out the preparation of the edges of the reels both on the outer side and on the inner side of the web material. In a possible embodiment, the apparatus 50 may be configured to alternatively carry out preparation of the edges on the outer side and on the inner side of the web material, so as to obtain—on the reel-holder unit 10 located at the outlet station 54—reels with the joint elements located on the outer side, and reels with the joint elements located on the inner side alternating with each other. Preparing the edge on the outer side or on the inner side may be carried out in alternating sequence, or preparing the edges of a certain number of reels on the outer side and a certain number of reels on the inner side can be programmed, as required.

FIGS. 11-20 schematically illustrate the sequence for preparing the edge of a reel on the outer side of the web material, and FIGS. 21-31 schematically illustrate the sequence for preparing the edge of a reel on the inner side of the web material.

With reference to FIGS. 8 and 11, the apparatus 50 comprises a feeder 70 configured for feeding adhesive elements intended to be applied on the reels 12. The feeder 70 may, for example, comprise two rollers 72, which can be operated to advance a belt 74 on which arrays of adhesive elements can be arranged. The apparatus 50 may also comprise a manipulator 76, for example, an anthropomorphic robot, configured to pick up adhesive elements from the feeder 70 and to apply the adhesive elements to the outer surface of the reel 12. The manipulator 76 may have a head 78 configured for picking up the adhesive elements from the belt 74 of the feeder 70. The head 78 of the manipulator 76 may, for example, pick up the adhesive elements by suction.

With reference to FIGS. 10, 11 and 12, in order to prepare the edge on the outer side of the web material, after a reel has been picked up by the pick-up device 56, the reel 12 is rotated by 180° around the vertical axis D, as indicated by the arrow F in FIG. 11, by means of a rotation around the axis D of the rotatable support 60 of the reel pick-up device 56. As illustrated in FIGS. 11 and 12, the manipulator 76 picks up a first adhesive element 80 from the feeder 70 and applies it to the outer surface of the reel 12.

The position at which the first adhesive element 80 is applied (FIG. 12) is known to the control unit since the coordinates of the head 78 of the manipulator are known at the moment wherein the first adhesive element 80 is applied to the outer surface of the reel 12.

In a possible embodiment, the first adhesive element 80 may have an inner adhesive surface that is applied in contact with the outer surface of the reel 12 and an outer surface impermeable to gases, which allows the adhesive element 80 to be picked up by suction.

Figure 13:
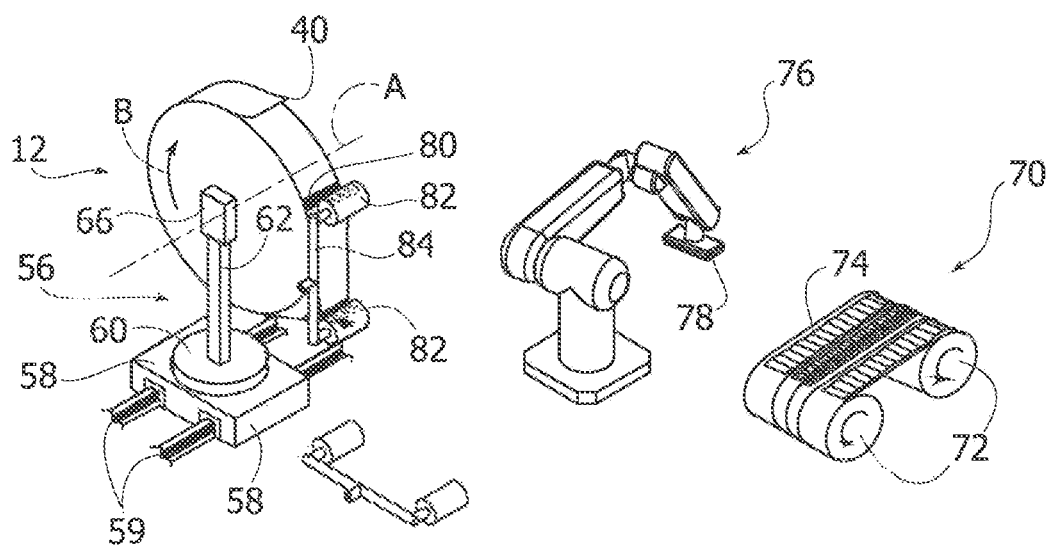
Figure 14:
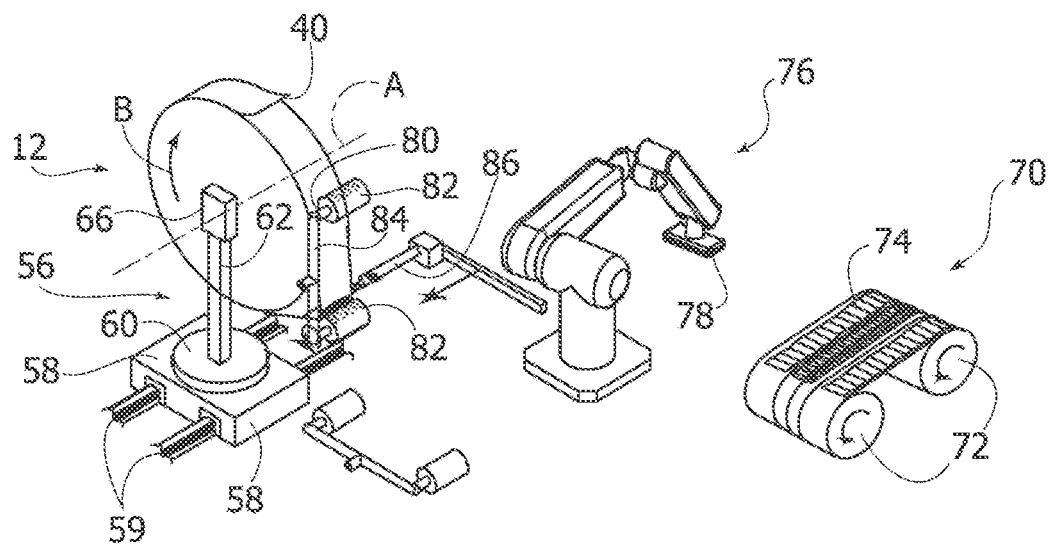

With reference to FIGS. 13 and 14, the first adhesive element 80 applied to the outer surface of the reel 12 is gripped by means of a gripping member 82. The gripping member 82 may be a roller connected to a suction source, which picks up the first adhesive element 80 by suction. This allows gripping of the outer turn of the reel 12 by suction, even in the case in which the web material is a porous material (typically a non-woven fabric). In a possible embodiment, the apparatus 50 may comprise a gripping tool 84, which carries two gripping members 82 parallel to each other.

The gripping member 82 can grip the outer turn of the reel 12, without the need to know the position of the leading edge 40 of the reel, since the gripping of the web material is carried out on the first adhesive element 80 whose position is known by the electronic control unit of the apparatus 50.

After gripping the first adhesive element 80, the gripping tool 84 moves the gripping member 82 away from the reel 12. In this way, a loop is formed between the outer turn of web material and the remaining part of the reel 12. As illustrated in FIG. 14, a cutting device 86 is inserted into the loop formed by the outer turn of web material and transversely cuts the web material. In a possible embodiment, cutting of the web material may be carried out between the two gripping members 82 of the gripping tool 84. The transverse cutting of the web material is performed downstream of the gripping area with reference to the direction of unwinding the web B.

Figure 15:
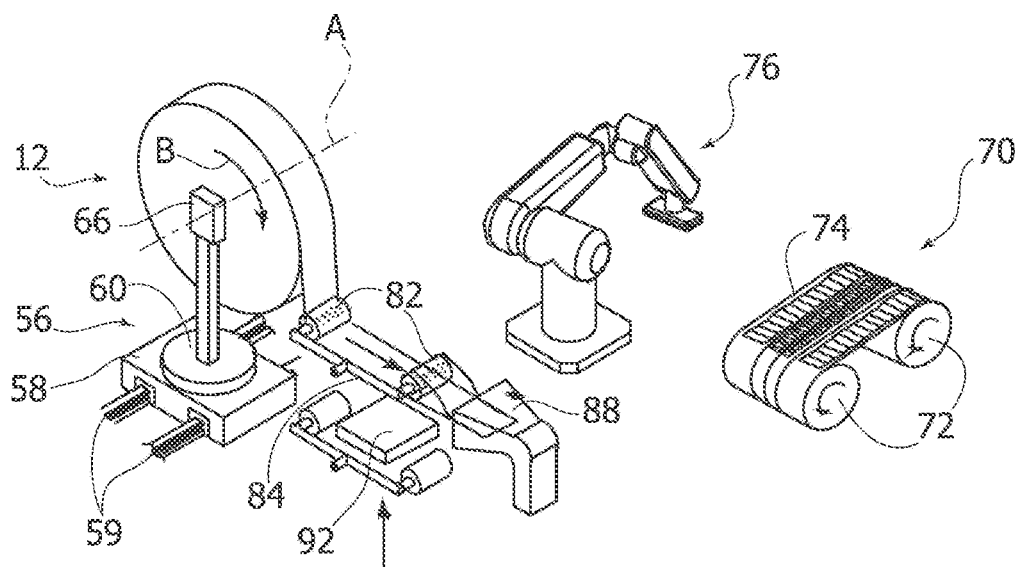

After transversely cutting the web, the gripping tool 84 may be rotated as illustrated in FIG. 15 to move the end of the web generated by the transverse cut away from the reel 12. This end is picked up by a suction device 88. While the end of the web material is aspirated by the suction device 88, a section of web material with a length equal to or greater than the circumference of the reel 12 is unwound from the reel 12. In this way, all the web material forming the outer turn is unwound from the reel 12, including the section comprising the leading edge 40. The web section that is unwound from the reel 12 is aspirated by the suction device 88.

With reference to FIG. 15, during the unwinding and suction step of the web section forming the outer turn of the reel 12, the web may be held in a horizontal position between the two gripping members 82 of the gripping tool 84. The outer surface of the web section unwound from the reel 12 faces upwards.

Figure 16:
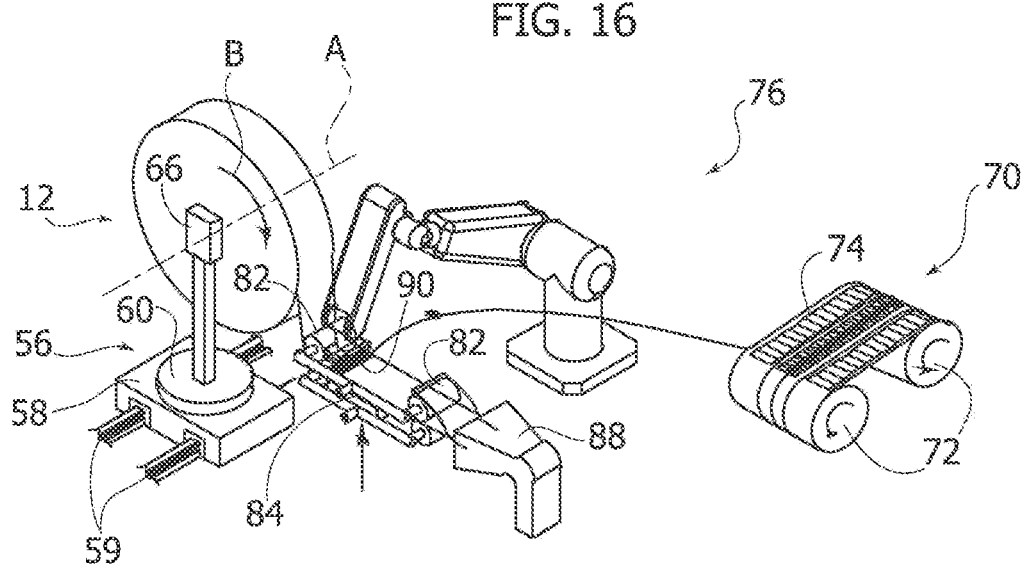

With reference to FIG. 16, at the end of the unwinding and suction step of the web section forming the outer turn of the reel 12, the manipulator 76 picks up a second adhesive element 90 and applies it to the outer surface of the web material. The manipulator 76 may apply the second adhesive element 90 with a top-down movement on the web section obtained in a horizontal position. A movable contrast surface 92 (FIG. 15) may be provided, which is arranged under the horizontal web to provide a support surface against which the head 78 can be pressed for applying the second adhesive element 90. The manipulator 76 may pick up the second adhesive element 90 from the same feeder 70 from which the first adhesive element 80 (which was discarded with the material forming the outer turn of the reel 12) was previously picked-up. The second adhesive element 90 may be a double-sided adhesive tape and may have metal elements integrated therein to allow detection of the joint zone of the two webs by means of a metal detector.

Figure 17:
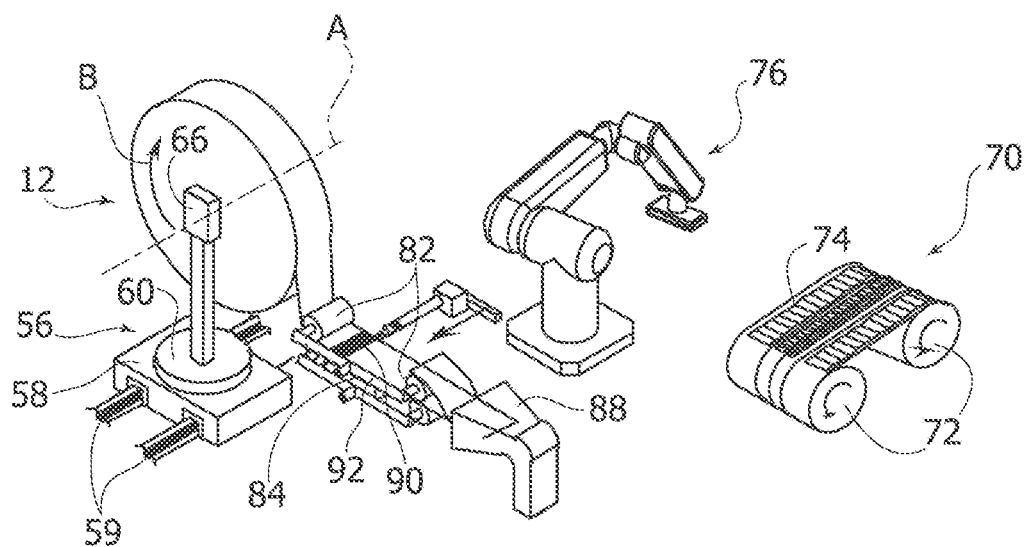

After applying the second adhesive element 90, the cutting device 86 transversely cuts the web material downstream of the second adhesive element 90 as illustrated in FIG. 17. The section of cut web material is aspirated by the suction device 88 and is discarded as waste.

In a possible embodiment, two or more adhesive elements 90 each having specific properties may be applied.

Figure 18:
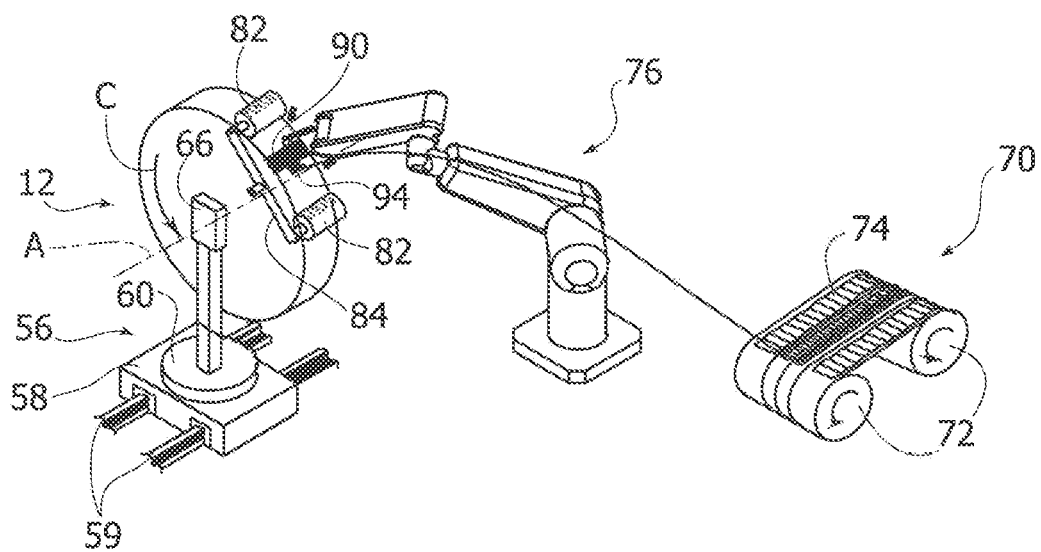

Then, as illustrated in FIG. 18, the end web portion on which the second adhesive element 90 has been applied is rewound onto the reel 12. Rewinding may be carried out by rotating the shaft 64 of the reel pick-up device 56 in the direction C opposite to the unwinding direction of the reel 12.

The step of preparing the edge of the reel may be concluded by applying an adhesive closing element 94 to the end of the web material (FIGS. 18 and 19). Applying the adhesive closure element 94 may be carried out by means of the manipulator 76, which can pick up the adhesive closing element 94 from the feeder 70 as shown in FIG. 18.

With reference to FIGS. 19 and 20, at the end of the steps for preparing the edge of the reel 12, the reel pick-up device 56 moves in the direction D towards the outlet station 54, and deposits the reel 12 on the reel-holder unit 10 located at the outlet station 54. The reel-holder unit 10 located at the outlet section 54 has its open side facing the reel pick-up device 56 so that the reel pick-up device 56 can be inserted between the two frame sections 18 of the reel-holder unit 10 until the reel 12 comes into contact with the header 20 of the reel-holder unit 10, or with a previously deposited reel 12. At this point, the reel 12 is placed on the reel support bars 24 of the reel-holder 10, and the reel pick-up device 56 is moved away from the outlet station 54 by extracting the shaft 64 from the central hole 68 of the reel 12.

FIGS. 21-31 illustrate the sequence of operations for preparing the edges of the reels 12 on the inner side of the web material.

FIG. 21 illustrates the picking-up of a reel by the reel pick-up device 56 at the inlet station 52. This operation takes place in the same way as previously described.

With reference to FIG. 22, after picking up a reel 12 by means of the reel pick-up device 56, the reel 12 is held by the reel pick-up device 56 in the same orientation with which it was picked up by the reel-holder unit 10.

Figure 23:
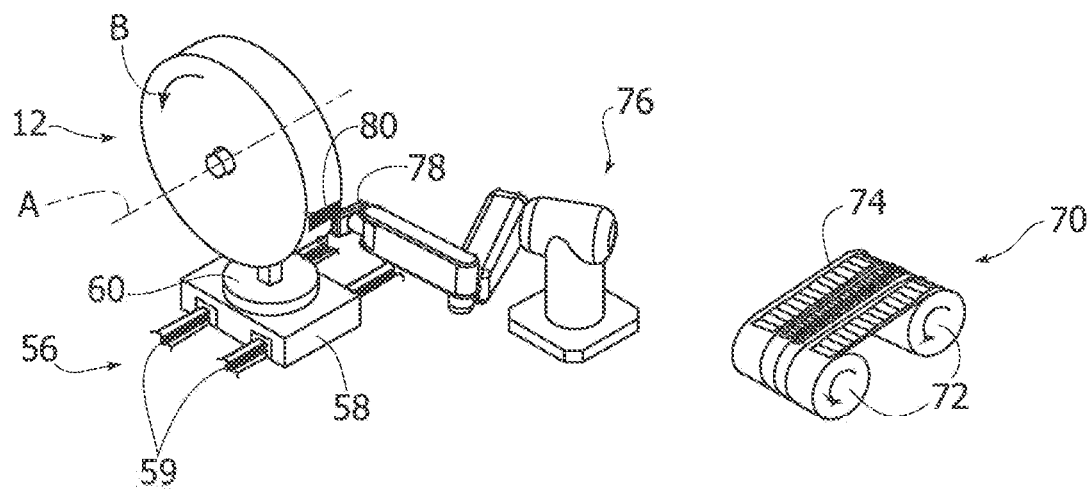

With reference to FIGS. 22 and 23, the manipulator 76 picks up a first adhesive element 80 from the feeder 70 and applies it to the outer surface of the reel 12, as in the embodiment described above.

Figure 24:
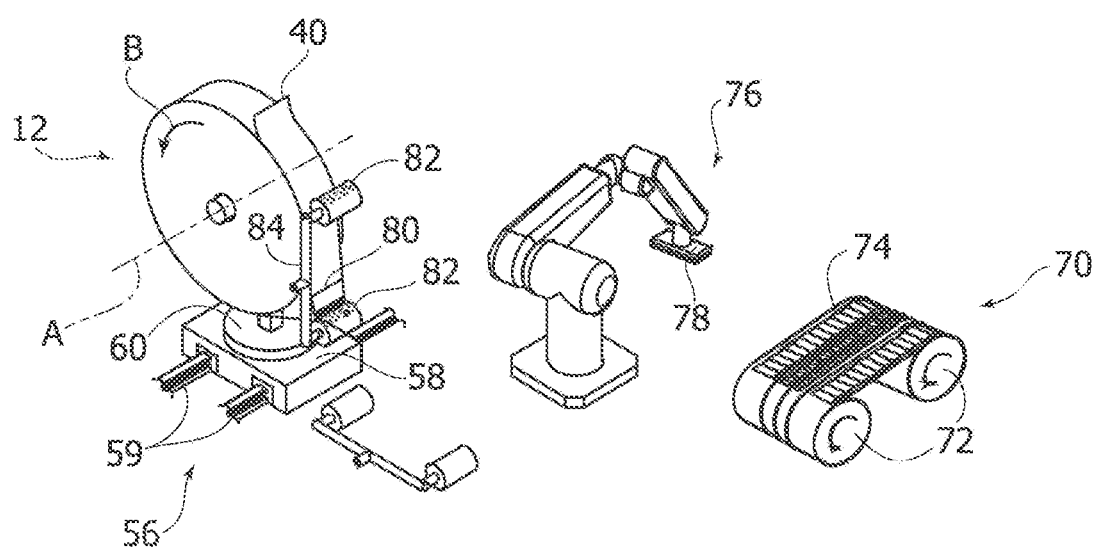

Then, as illustrated in FIG. 24, the first adhesive element 80 is picked up by the gripping member 82 and is moved away from the reel to form a loop.

Figure 25:
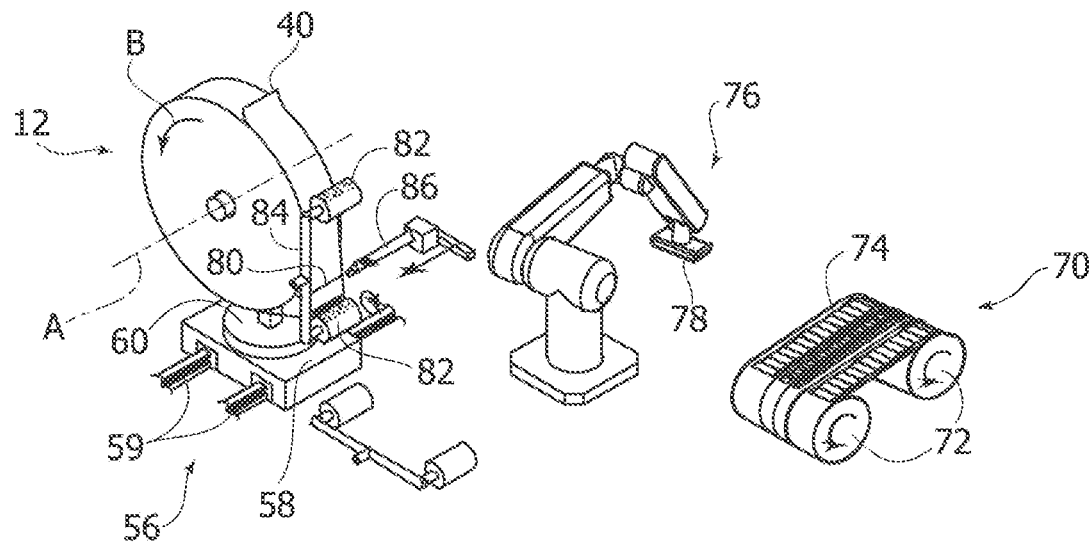

With reference to FIG. 25, the cutting member 86 is introduced into the loop and carries out the transverse cut of the web material downstream of the first adhesive element 80 with reference to the unwinding direction of the reel 12 indicated by the arrow B.

Figure 26:
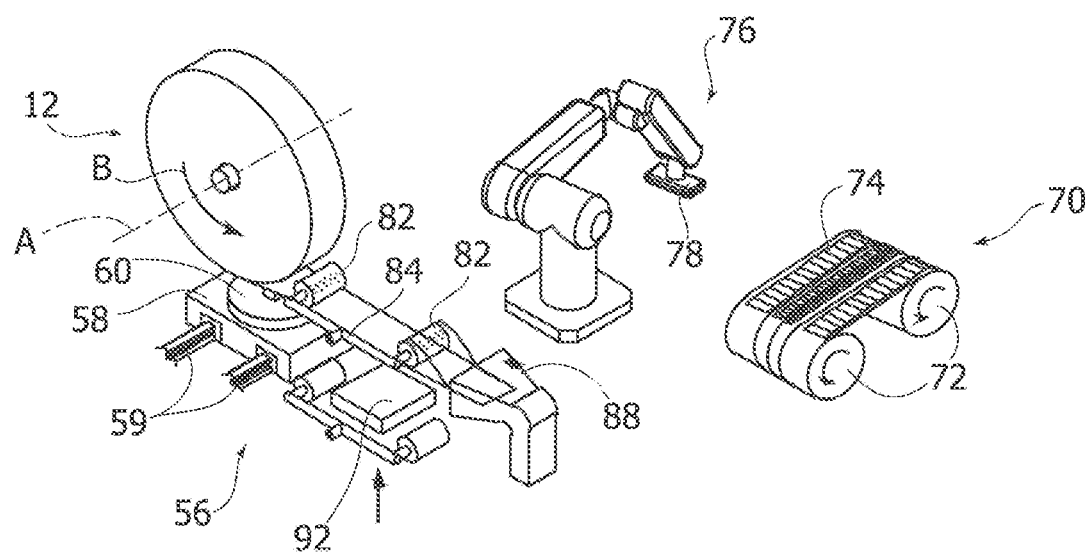

With reference to FIG. 26, as in the embodiment described above, a web section with a length equal to or greater than the length of the circumference of the reel 12 is then unwound, and this web section is aspirated by the suction device 88. As shown in FIG. 26, in this embodiment, the inner side of the web section unwound from the reel 12 faces upwards.

Figure 27:
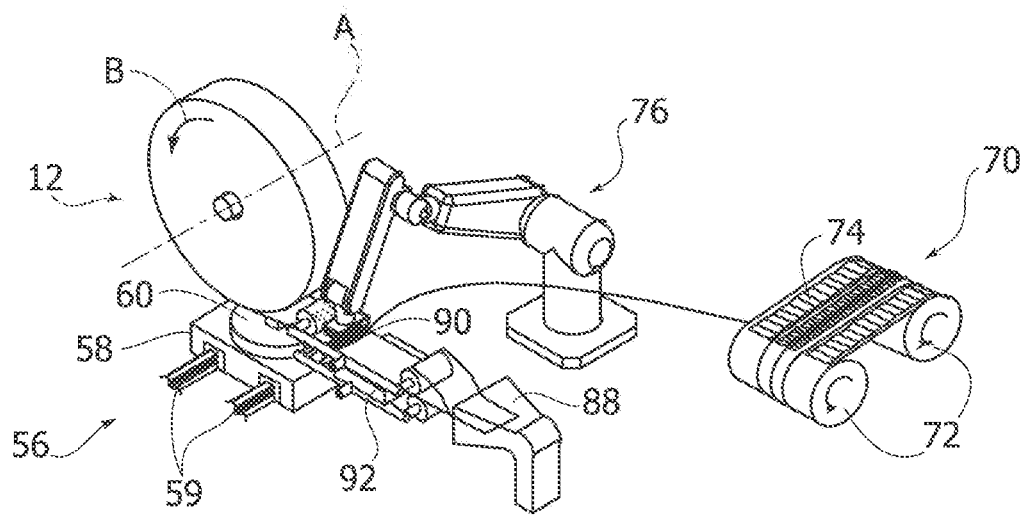
Figure 28:
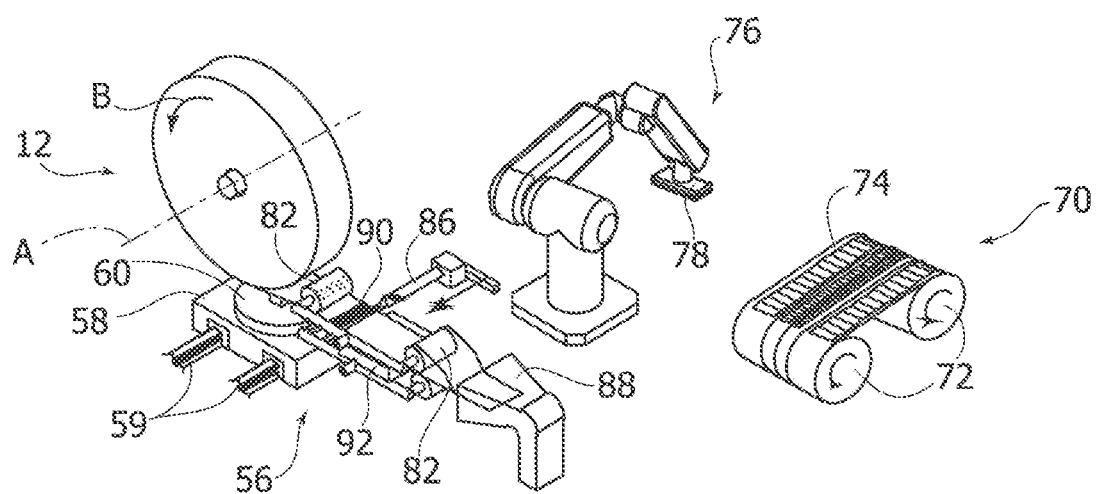

With reference to FIG. 27, the manipulator 76 picks up a second adhesive element 90 and applies it to the inner surface of the web section unwound from the reel 12. Then, as illustrated in FIG. 28, the cutting device 86 carries out the transverse cut of the web section unwound from the reel 12 downstream of the second adhesive element 90. The cut leading portion of the web is aspirated by the suction device 88 and is discarded as waste.

Figure 29:
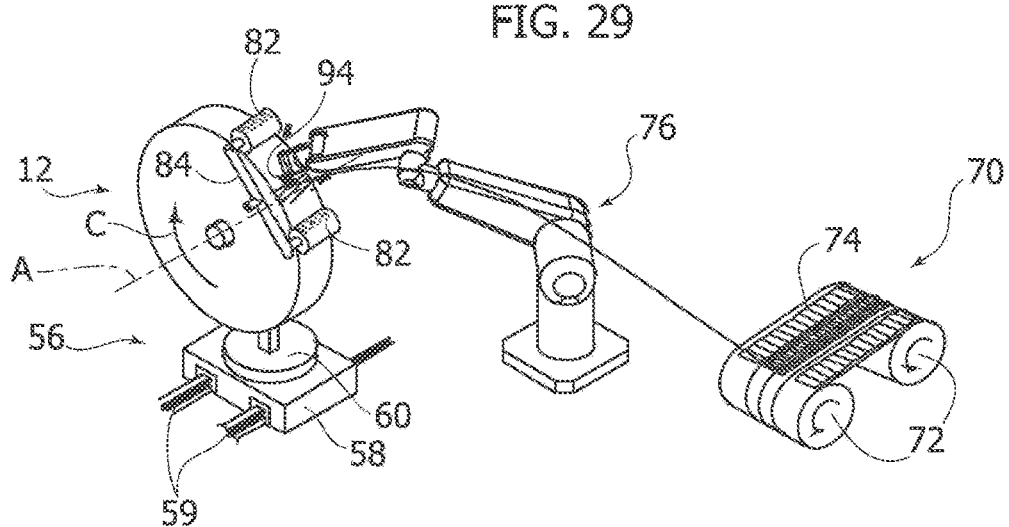

Then, as illustrated in FIG. 29, the web section unwound from the reel 12 that remains after cutting the leading portion is rewound on the reel 12 by rotating the, reel around the horizontal axis A in the direction C opposite to the unwinding direction B of the reel 12. At this point, the manipulator 76 may apply an adhesive closing element 94 to attach the edge of the web material onto the outer surface of the reel 12.

Figure 30:
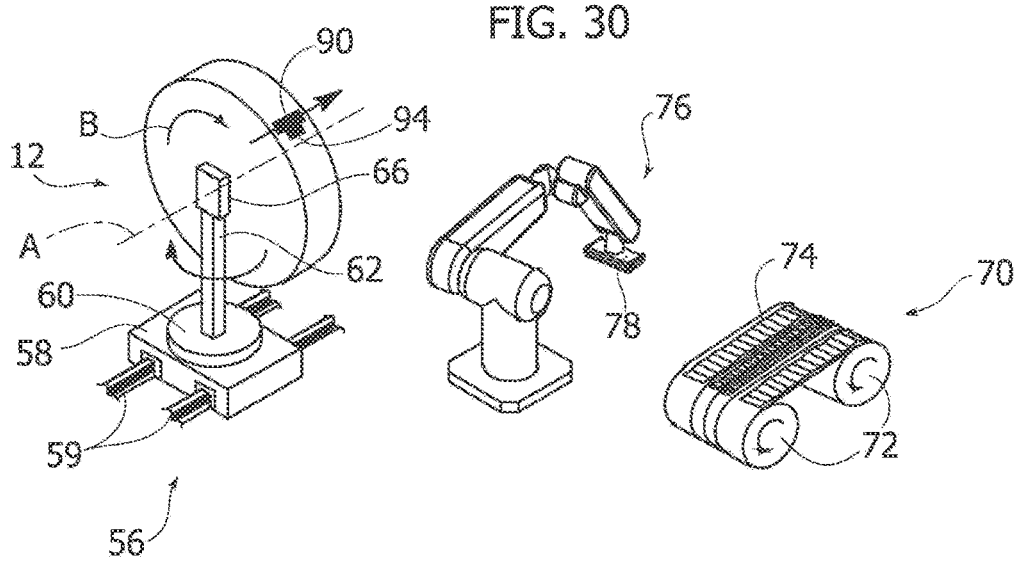

Then, as illustrated in FIG. 30, the reel 12 is rotated by 180° around a vertical axis by rotation of the rotating support 60 of the reel pick-up device 56.

Figure 31:
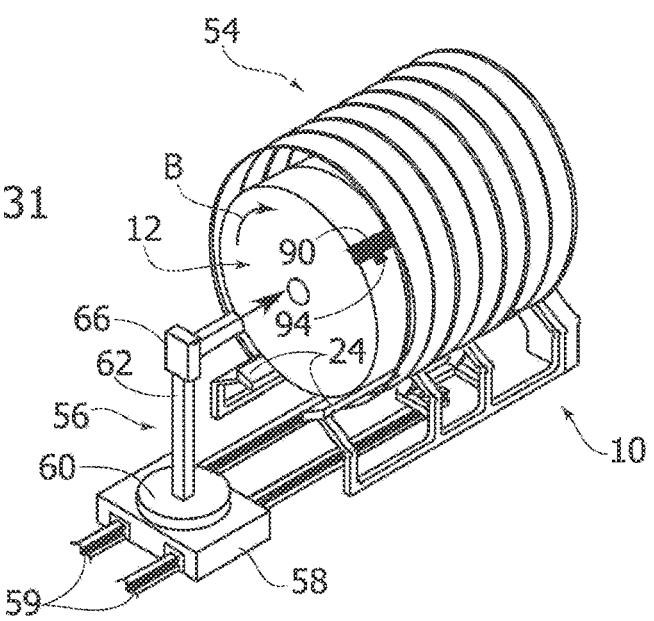

Finally, as illustrated in FIG. 31, the reel 12 is deposited on the reel-holder unit 10 located at the outlet station 54.

The reels 12 arranged on the reel-holder unit 10 in the outlet station 54 may all be arranged with the respective unwinding directions B in agreement with each other.

In a possible embodiment, the apparatus 50 may be configured to alternately carry out the preparation of the edges of the reels 12 on the outer surface and on the inner surface of the web material, so that the reels deposited on the reel-holder unit 10 in the station outlet 54 can alternately be arranged on the downstream winder and on the upstream winder of an unwinding assembly.

When the reel-holding unit 10 located at the outlet station 54 is complete, it is transported to an unwinding assembly of a production machine where the reels are loaded manually or automatically onto the winders of the unwinding unit.

Of course, without prejudice to the principle of the invention, the details of construction and the embodiments can be widely varied with respect to those described and illustrated, without thereby departing from the scope of the invention as defined by the claims that follow.

The invention claimed is:

1. A method for preparing edges of reels of web material, comprising:
    arranging a plurality of reels in an inlet station arranged with respective axes aligned along a horizontal axis,
    picking up a reel of the plurality of reels in said inlet station by a reel pick-up device translatable along at least one horizontal direction and having a horizontal shaft that engages a central hole of the reel,
    applying a first adhesive element on an outer surface of the reel,
    gripping said first adhesive element by a gripping member and moving the gripping member away from the reel so as to form a loop between a section of an outer turn of the web material and a remaining part of the reel,
    inserting a cutting member into said loop and transversely cutting the web material downstream of said first adhesive element with reference to an unwinding direction of the reel,
    unwinding a section of web material from the reel with a length equal to or greater than a length of a circumference of the reel and aspirating one end of web material unwound from the reel,
    applying a second adhesive element on an outer surface or on an inner surface of the section of web material unwound from the reel,
    transversely cutting the section of web material unwound from the reel downstream of the second adhesive element and discarding as waste a section of the unwound web material downstream of this transverse cut,
    rewinding a remaining section of web material onto the reel, and
    depositing the reel in an outlet station.

2. The method according to claim 1, comprising applying said second adhesive element onto the outer surface of the web material of said reel and onto an inner surface of the web material of a second reel.

3. The method according to claim 1, comprising rotating said reel by 180° about a vertical axis perpendicular to the axis of the reel between the step of picking up the reel at the inlet station and the step of depositing the reel in the outlet station.

4. The method according to claim 3, wherein said step of rotating the reel about a vertical axis is performed before applying said first adhesive element onto the outer surface of the reel.

5. The method according to claim 3, wherein said step of rotating the reel about a vertical axis is performed after applying said second adhesive element.

6. The method according to claim 1, comprising applying an adhesive closing element for attaching an edge of the web material having said second adhesive element onto the outer surface of the reel.

7. The method according to claim 1, wherein applying said first adhesive element and said second adhesive element is carried out by an anthropomorphic robot.

* * * * *